(12) United States Patent
Lemke et al.

(10) Patent No.: US 7,966,435 B2
(45) Date of Patent: Jun. 21, 2011

(54) INTEGRATED CIRCUIT DESIGN STRUCTURE FOR AN ASYCHRONOUS DATA INTERFACE

(75) Inventors: Scott J. Lemke, Raleigh, NC (US);
Kevin N. Magill, Raleigh, NV (US);
Michael S. Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/105,449

(22) Filed: Apr. 18, 2008

(65) Prior Publication Data

US 2008/0195774 A1 Aug. 14, 2008

Related U.S. Application Data

(63) Continuation-in-part of application No. 11/622,445, filed on Jan. 11, 2007.

(51) Int. Cl.
*G06F 17/50* (2006.01)
*G06F 3/00* (2006.01)
(52) U.S. Cl. .................... 710/52; 703/1; 703/14; 710/55
(58) Field of Classification Search .................. 703/1, 3, 703/4, 13–22; 710/1, 52–57
See application file for complete search history.

(56) References Cited

U.S. PATENT DOCUMENTS

| 5,179,664 | A | 1/1993 | Li et al. |
| 5,524,270 | A | 6/1996 | Haess et al. |
| 5,781,802 | A | 7/1998 | Cassetti |
| 5,898,854 | A | 4/1999 | Abramson et al. |
| 6,055,285 | A * | 4/2000 | Alston ............................ 375/372 |
| 6,101,329 | A | 8/2000 | Graef |
| 6,389,490 | B1 | 5/2002 | Camilleri et al. |
| 6,807,640 | B2 | 10/2004 | Fischer |
| 6,842,728 | B2 | 1/2005 | Gooding et al. |
| 6,845,435 | B2 | 1/2005 | Nagasawa et al. |
| 7,500,044 | B2 | 3/2009 | Wang et al. |
| 2001/0042219 | A1 | 11/2001 | Robertson |
| 2004/0255188 | A1 | 12/2004 | Lo |
| 2005/0177657 | A1 | 8/2005 | Pope et al. |
| 2006/0036918 | A1 | 2/2006 | Turner et al. |

OTHER PUBLICATIONS

Victor P. Nelson, H. Troy Nagle, J. David Irwin, Bill D. Carroll; Digital Logic Circuit Analysis & Design; 1995; Perntice Hall; pp. 140-148.*
U.S. Appl. No. 11/622,445, filed Jan. 11, 2007, entitled: "Asynchronous Data Interface,".
Office Action History of U.S. Appl. No. 11/622,445, dates ranging from Jul. 22, 2009 to Jun. 28, 2010.

* cited by examiner

*Primary Examiner* — Alford W Kindred
*Assistant Examiner* — Richard B Franklin
(74) *Attorney, Agent, or Firm* — Patterson & Sheridan, LLP

(57) ABSTRACT

A design structure embodied in a machine readable storage medium for designing, manufacturing, and/or testing a design, the design structure comprising for an interface system is disclosed. The system includes a buffer that receives data from a source in a first clock domain and stores the data to be read by a destination in a second clock domain, wherein the buffer functions in both the first clock domain and the second clock domain; a write pointer that points to data written by the source; and a read pointer that points to data read by the destination. According to the design structure, the write pointer and the read pointer are utilized to enable the data to be transmitted from the first clock domain to the second clock domain asynchronously.

20 Claims, 6 Drawing Sheets

US 7,966,435 B2

INTEGRATED CIRCUIT DESIGN STRUCTURE FOR AN ASYCHRONOUS DATA INTERFACE

CROSS-REFERENCE TO RELATED APPLICATION

This application is a continuation-in-part of co-pending U.S. patent application Ser. No. 11/622,445, filed Jan. 11, 2007, which is herein incorporated by reference.

BACKGROUND OF THE INVENTION

Field of Invention

The present invention generally relates to design structures, and more specifically, design structures for computer systems, and more particularly to an asynchronous data interface.

Asynchronous data interfaces are well known. An asynchronous data interface generally connects two systems such as a processor core and an external bus, where the two systems operate in independent time domains. In other words, there are two different clock domains, each domain having its own clock with different rates, frequencies, phases, etc.

In order to transmit data from one clock domain to another clock domain, the data typically needs to be synchronized between the two clock domains. One solution is to rely on a fixed frequency difference between the two sides of the interface to transfer a packet of data. A problem with this solution is that the frequencies need to be known in order to determine when data may be transmitted from one system to another. For the frequencies to be known, the frequencies need to be calculated, which requires additional system time and resources.

Another solution is utilizing data interfaces that use a single bit when crossing clock domains to avoid multiple bits being latched in different clock cycles. Once the single bit safely reaches the destination side, the full data width may be sampled. However, the single bit is not considered "safe" until metastability is resolved. Metastability is usually resolved by latching the bit two or more times in the destination clock domain. Once the full data width is sampled by the destination side, it must signal to the source side that data has been accepted. This is done by sending another single bit acknowledgement to the source side. In other words, the source side does not count a certain number of clock cycles before the acknowledgement is seen. Once the acknowledge bit safely reaches the source side, the source may drop the data and begin the process again with new data. A problem with this solution is that while it may work independently of clock ratios, it limits the writing of subsequent data until the current data has been read by the destination, which takes a certain number of clock cycles (e.g., 6 clock cycles) to complete.

Accordingly, what is needed is an improved data interface. The present invention addresses such a need.

SUMMARY OF THE INVENTION

A data interface system is disclosed. In one embodiment, the system includes a buffer that receives data from a source in a first clock domain and stores the data to be read by a destination in a second clock domain, where the buffer functions in both the first clock domain and the second clock domain; a write pointer that points to data written by the source; and a read pointer that points to data read by the destination.

According to the system and method disclosed herein, the write pointer and the read pointer are utilized to enable the data to be transmitted from the first clock domain to the second clock domain asynchronously.

DETAILED DESCRIPTION OF THE INVENTION

Figure 1:
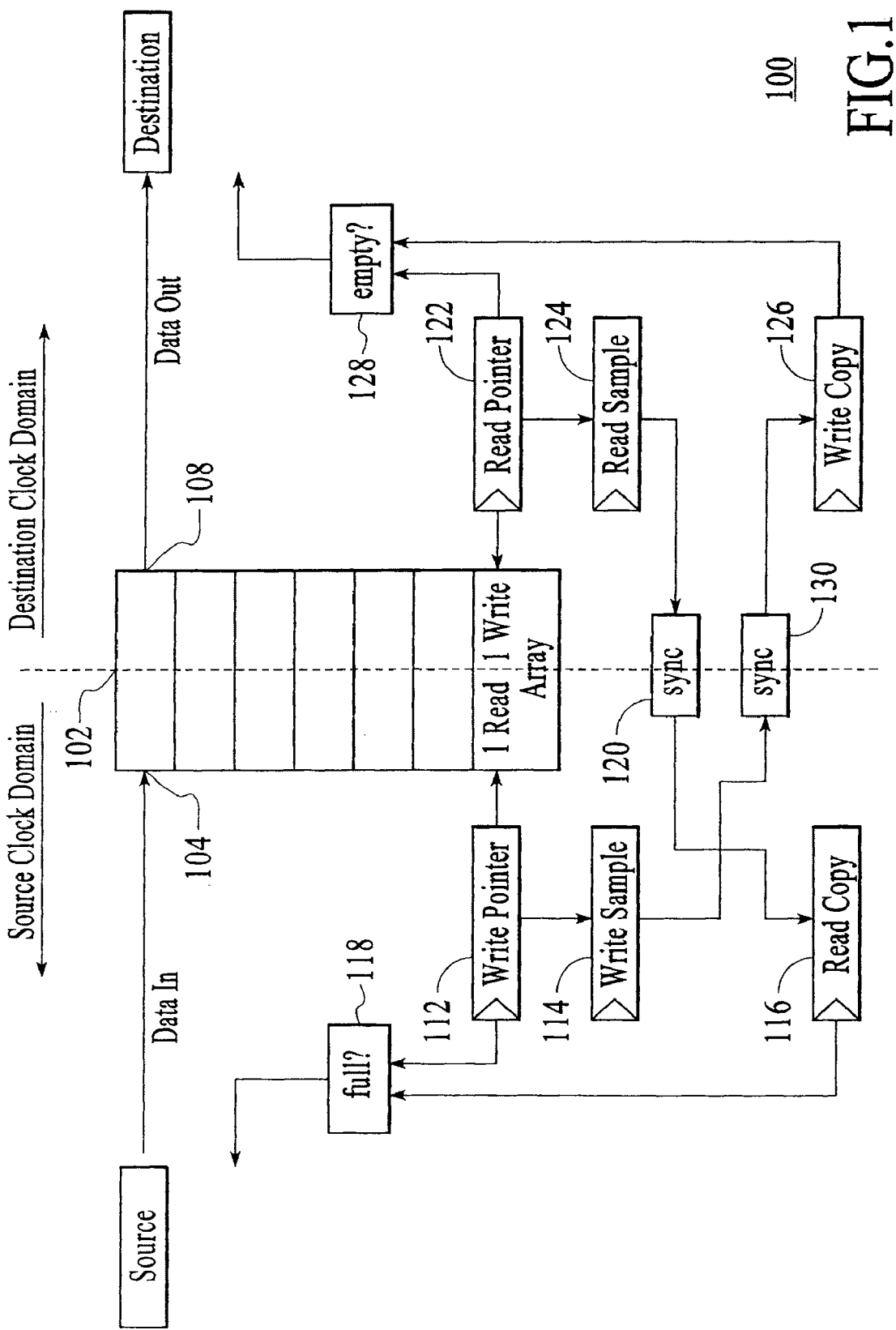
FIG. 1 is a block diagram of an asynchronous data interface system in accordance with one embodiment.

The present invention relates to computer systems, and more particularly to an asynchronous data interface. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

An data interface system is disclosed. In one embodiment, the system includes a buffer that receives data from a source in a source clock domain and stores the data to be read by a destination in a destination clock domain. The buffer functions in both the source clock domain and the destination clock domain. The system also includes a write pointer that points to data written by the source and includes a read pointer that points to data read by the destination. The system transfers the data from the source clock domain to the destination clock domain continuously as long as the buffer is neither full nor empty. The system utilizes the write pointer and the read pointer to determine whether the buffer is full or empty. According to the system and method disclosed herein, the write pointer and the read pointer enable the data to be transmitted from the first clock domain to the second clock domain asynchronously.

In one embodiment, a design structure embodied in a machine readable storage medium for at least one of designing, manufacturing, and testing a design is provided. The design structure generally includes an interface system, which includes a buffer that receives data from a source in a first clock domain and stores the data to be read by a destination in a second clock domain, and wherein the buffer functions in both the first clock domain and the second clock domain. The interface system also includes a write pointer that points to data written by the source, and a read pointer that points to data read by the destination, wherein the write pointer and the read pointer are utilized to enable the data to be transmitted from the first clock domain to the second clock domain asynchronously.

A design structure embodied in a machine readable storage medium for at least one of designing, manufacturing, and testing a design is provided. The design structure generally includes a system that includes a processor, a buffer coupled to the processor, wherein the buffer receives data from a source in a first clock domain and stores the data to be read by a destination in a second clock domain, wherein the buffer functions in both the first clock domain and the second clock domain, a write pointer that points to data written by the source, and a read pointer that points to data read by the destination, wherein the write pointer and the read pointer are utilized to enable the data to be transmitted from the first clock domain to the second clock domain asynchronously.

Although the present invention disclosed herein is described in the context of write pointers, the present invention may apply to read pointers, and still remain within the spirit and scope of the present invention.

FIG. 1 is a block diagram of an asynchronous data interface system 100 in accordance with one embodiment. The asynchronous data interface system 100 includes a buffer 102, also referred to as a rolling buffer. The buffer 102 includes a write port 104 in one time domain (e.g., the source clock domain) for writing data into the buffer 102, and includes a read port 108 in the other time domain (e.g., the destination clock domain) for reading from the buffer 102. In one embodiment, the write port 104 is controlled by the source side, and the read port 108 is controlled by the destination side. The asynchronous data interface system 100 also includes a write pointer unit 112 for storing a write pointer, a write sample unit 114 for storing a sampled version of the write pointer to be sent to the destination side of the interface, a read copy unit 116 for storing a sampled copy of the destination read pointer, and a full determination unit 118 for determining when the buffer 102 is full, and a synchronization unit 120. Any appropriate types of write and read pointers may be used. The asynchronous data interface system 100 also includes a read pointer unit 122, a read sample unit 124 for storing a sampled version of the read pointer for the source, a write copy unit 126 for storing a sampled copy of the source write pointer, an empty determination unit 128, and a synchronization unit 130. In one embodiment, the full and empty determination units 118 and 128 may be implemented with comparators, depending on the specific pointer implementation.

Figure 2:
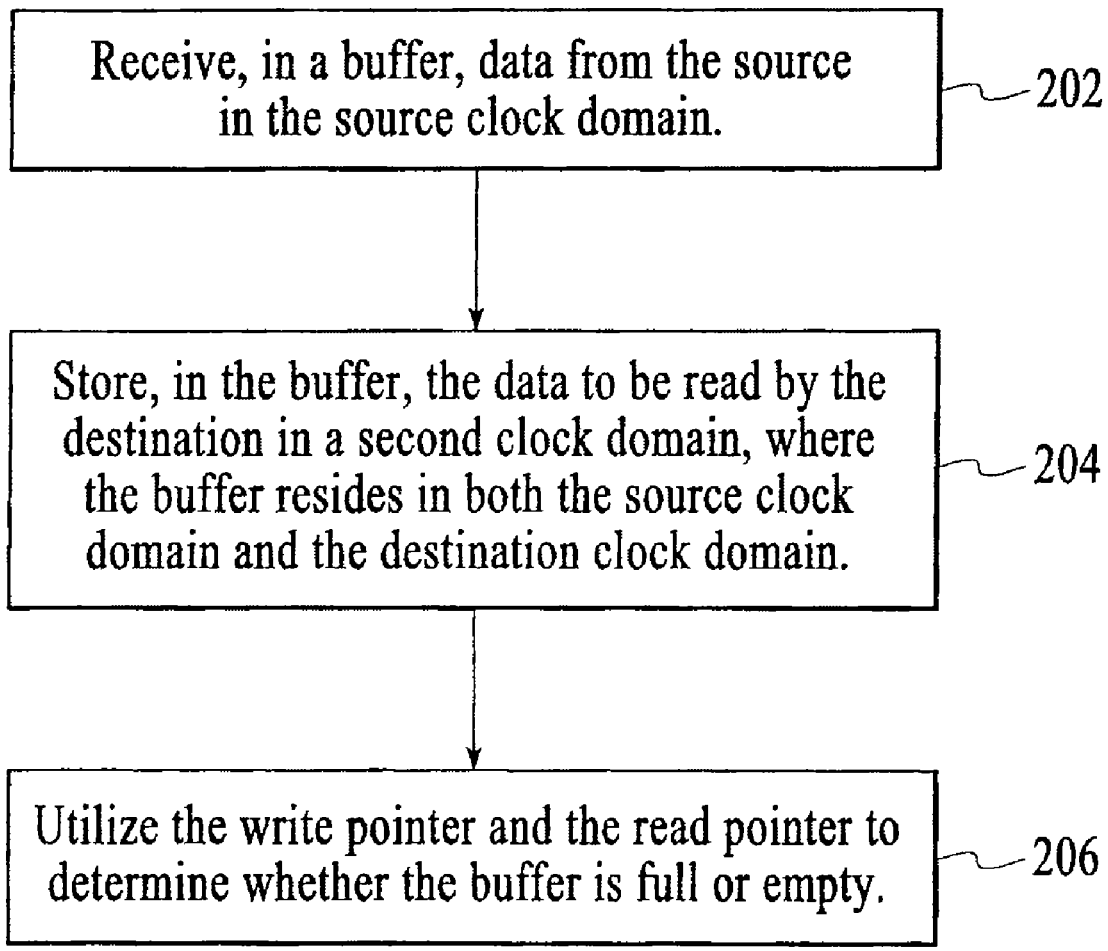
FIG. 2 is a flow chart showing a method for transferring data from one clock domain to another clock domain in accordance with one embodiment of the present invention.

FIG. 2 is a flow chart showing a method for transferring data from one clock domain to another clock domain in accordance with one embodiment of the present invention. Referring to both FIGS. 1 and 2 together, the process begins in step 202 where the buffer 102 receives data from the source in the source clock domain. Next, in step 204, the buffer 102 stores the data to be read by the destination in a second clock domain. As described above, the buffer functions in both the source clock domain and the destination clock domain, via the write port being controlled by the write pointer on the source side and the read port being controlled by the read pointer on the destination side. As described in more detail below, data can be continuously transmitted from the source to the destination as long as the buffer is neither full nor empty. Next, in step 206, the asynchronous data interface system 100 utilizes the write pointer and the read pointer to determine whether the buffer is full or empty. As described in more detail below, the buffer 102, being in both time domains, enables the source side to write to the buffer 102 in its own clock domain, and enables the destination side to read from the buffer 102 in its own domain.

In one embodiment, the source updates the sampled write pointer whenever it is not equal to the current write pointer, and signals the destination that the source's sampled write pointer has been updated. The source will then wait for an acknowledgement from the destination that the sampled write pointer was seen before the next update of the write pointer can occur. The source, via the full determination unit 118, determines if the buffer 102 is full. In one embodiment, to determine whether the buffer 102 is full, the full determination unit 118 compares the current write pointer to a copy of the read pointer received from the read copy unit 116. The read copy unit 116 receives the copy of the read pointer from the read sample unit 124, which asynchronously samples copies of the read pointer.

In one embodiment, the write pointer unit 112, write sample unit 114, write copy unit 126, read pointer unit 122, read sample unit 124, and read copy unit 116 are initialized to a value of "all 0's" at system power on. Additionally, each unit is sized one bit wider than is traditionally needed to index a buffer of a given size (e.g., a buffer with 16 entries would use 5-bit pointers, rather than 4-bit). The most significant bit (MSB) is considered a "wrap bit" and is not used to access the buffer. This allows the write and read pointers to "wrap" back to the first entry of the buffer after writing/reading the last entry. The MSBs allow the full and empty units to determine if one pointer has "wrapped" relative to the other pointer and differentiate between an empty condition and a full condition. Each time a data value is written to the buffer, the write pointer is incremented by 1 and each time a data value is read from the buffer, the read pointer is incremented by 1. The buffer is empty when the write pointer matches the read pointer, including the MSB. Note the system is initialized to this state at power on. The buffer is full when all bits of the write pointer, except the MSB, are equal to all bits of the read pointer, except the MSB, and the MSB of the write pointer is not equal to the MSB of the read pointer.

A benefit of the embodiments described herein is that their implementations are not restricted to a particular brand of "pointer math." For example, some conventional solutions require the use of "Gray-coded pointers" in order to work properly, wherein the embodiments described herein do not. The implementation of the write pointer, read pointer, full detection, and empty detection are left to the user. In one embodiment, the empty and full units may be designed to handle the math of the read and write pointers the same as a buffer implementation that existed in a single clock domain. In other words, any method of tracking reads and writes in a buffer may be chosen, including how to manipulate and detect the pointers, and drop them into the system. With any method chosen, the read and write pointers may be asynchronously copied between clock domains so that empty/full units may perform read/write pointer math.

In one embodiment, because the full determination unit 118 is comparing a current write pointer to a copy of the read pointer which may be stale, the full determination unit 118 will be biased to determine the buffer 102 as being full. Similarly, because the empty determination unit 128 is comparing a current read pointer to a copy of the write pointer which may be stale, the empty determination unit 128 will be biased to determine the buffer 102 as being empty. This prevents over writing of data in a full buffer and re-reading data in an empty buffer.

While the buffer 102 is not full, the source may continue to write data to the buffer 102 and increment the write pointer until the buffer 102 is full. In one embodiment, the buffer 102 is sized such that in steady state operation the slower side of the asynchronous data interface system is not throttled by the speed of the interface.

In one embodiment, the destination will update the sampled read pointer when the current read pointer does not equal the sampled read pointer and signals the source that the sampled read pointer has been updated. The destination will then wait for an acknowledgement from the source that the sampled read pointer was seen and copied before the next update of the sampled read pointer can occur. The destination, via the empty determination unit 128, determines if the buffer 102 is empty. In one embodiment, to determine whether the buffer 102 is empty, the empty determination unit 128 compares the current read pointer to a copy of the write pointer received from the write copy unit 126. The write copy unit 126 receives the copy of the write pointer from the write sample unit 114, which asynchronously samples copies of the write pointer. While the buffer is not empty, the destination may read the data from the buffer 102 and increment the read pointer until the buffer 102 has been emptied. If the destination is slower than the source, the next update of the sampled write pointer will occur before the buffer 102 is completely emptied, preventing an underflow condition from occurring and optimizing the bandwidth of the interface.

Another benefit of the embodiments described herein is that they work independently of clock ratios and they allow multiple writes or reads without waiting for the other side to read/write. Also, as described above, as long as the buffer is neither full nor empty, data may be written to and read from the buffer 102 at an efficient rate (e.g., a rate of 1 entry per clock cycle). Also, the embodiments described herein sustain maximum throughput during steady-state data movement and enable data movement across asynchronous clock domains without relying on fixed frequency or phase relationships between the domains. Accordingly, the interface system works properly under any frequency and phase differences, and under dynamically changing frequency and phase differences.

Figure 3:
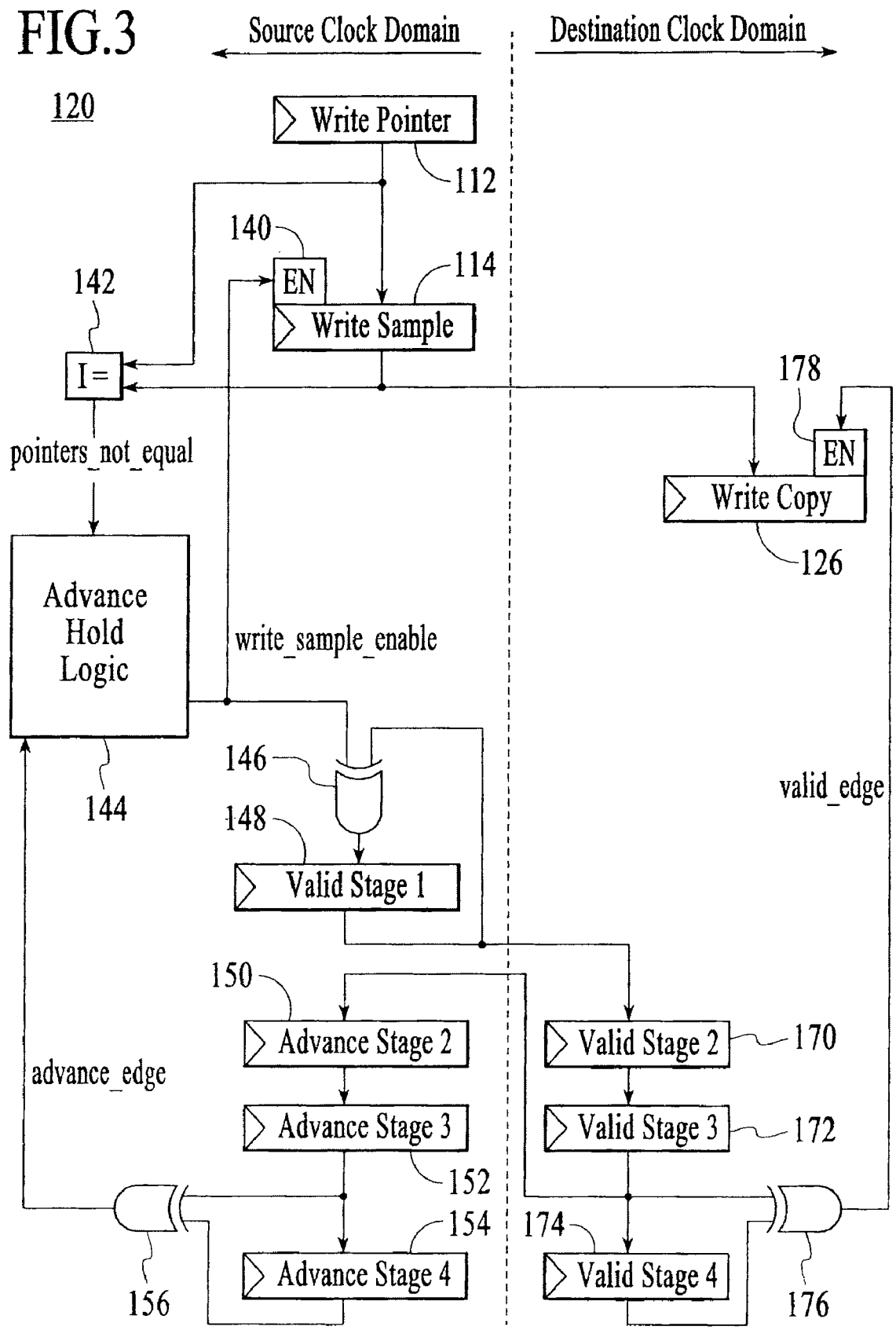
FIG. 3 is a block diagram of the synchronization unit, the write pointer unit, and the write sample unit, and the write copy unit of FIG. 1, in accordance with one embodiment.

FIG. 3 is a block diagram of the synchronization unit 120, the write pointer unit 112, and the write sample unit 114, and the write copy unit 126 of FIG. 1, in accordance with one embodiment. The synchronization unit 120 includes a write sample enable 140, a write pointer compare unit 142, advance hold logic unit 144, an write sample exclusive OR gate 146, a valid stage 1 unit 148, an advance stage 2 unit 150, an advance stage 3 unit 152, an advance stage 4 unit 154, and an advance edge exclusive OR gate 156. The synchronization unit 120 also includes a valid stage 2 unit 170, a valid stage 3 unit 172, a valid stage 4 unit 174, a valid edge exclusive OR gate 176, and a write copy enable 178.

In operation, if the write pointer is not the same as the write sample in the write sample unit 114, the write sample enable 140 turns on (e.g., outputs a "1"), which enables the write sample unit 114 to sample the write pointer and causes the advance hold logic 144 to toggle the value at valid stage 1 unit 148. This makes the write pointer and the write sample equal. The write pointer compare unit 142 outputs a "0," which causes the advance hold logic 144 to turn off the write sample enable 140, thus allowing the write sample unit 114 and valid stage 1 unit 148 to hold their values until an acknowledge is received and a new write pointer is written. When the write pointer and write sample are different, the advance hold logic 144 turns on write_sample_enable, which clocks the write pointer into the write sample and toggles the value in valid stage 1. The next cycle, when the write pointer and write sample are equal, advance hold logic 144 turns off write_sample_enable, which allows write sample and valid stage 1 to hold their values. Write_sample_enable is designed to be a single cycle pulse (only on during the cycle the pointer is copied from the write pointer to the write sample). The valid stage 1 unit 148 is a register that stores values (i.e., "1" or "0"), and because of the feedback loop through the write sample exclusive OR gate 146, the valid stage 1 unit 148 holds its stored value until the valid stage 1 is again toggled by the advance hold logic 144. In an example scenario, if all of the advance and valid stage units currently hold "0"s and the valid stage 1 unit 148 is toggled from a "0" to a "1," the rest of the advance and valid stage units also toggle to a "1" in the sequence shown in FIG. 3. In one embodiment, a delay may be imposed before transmitting data to the valid stage 1 148 and to the rest of the advance and valid stage units. While FIG. 3 shows a particular number of stage units (e.g., 7), the specific number of stage units will depend on the number of stage units required to resolve metastability in a particular application. Every additional stage unit provides extra time for data to stabilize, and the multiple stages of registers guarantees that the signal is stable. By the time the 0-to-1 or 1-to-0 transition is seen at valid Stage 3, the signal is stable, thus safe to bring across the multi-bit write pointer (then when the destination sees the new write pointer value, the data in the buffer has also been stable). The valid edge exclusive OR gate 176 functions as an edge detector that detects changes from a "0" to a "1" or from a "1" to a "0." When a change is detected, the valid edge exclusive OR gate 176 generates a single-cycle pulse that turns the write copy enable 178 on. This enables the write copy unit 126 to store the write sample from the write sample unit 114.

Figure 4:
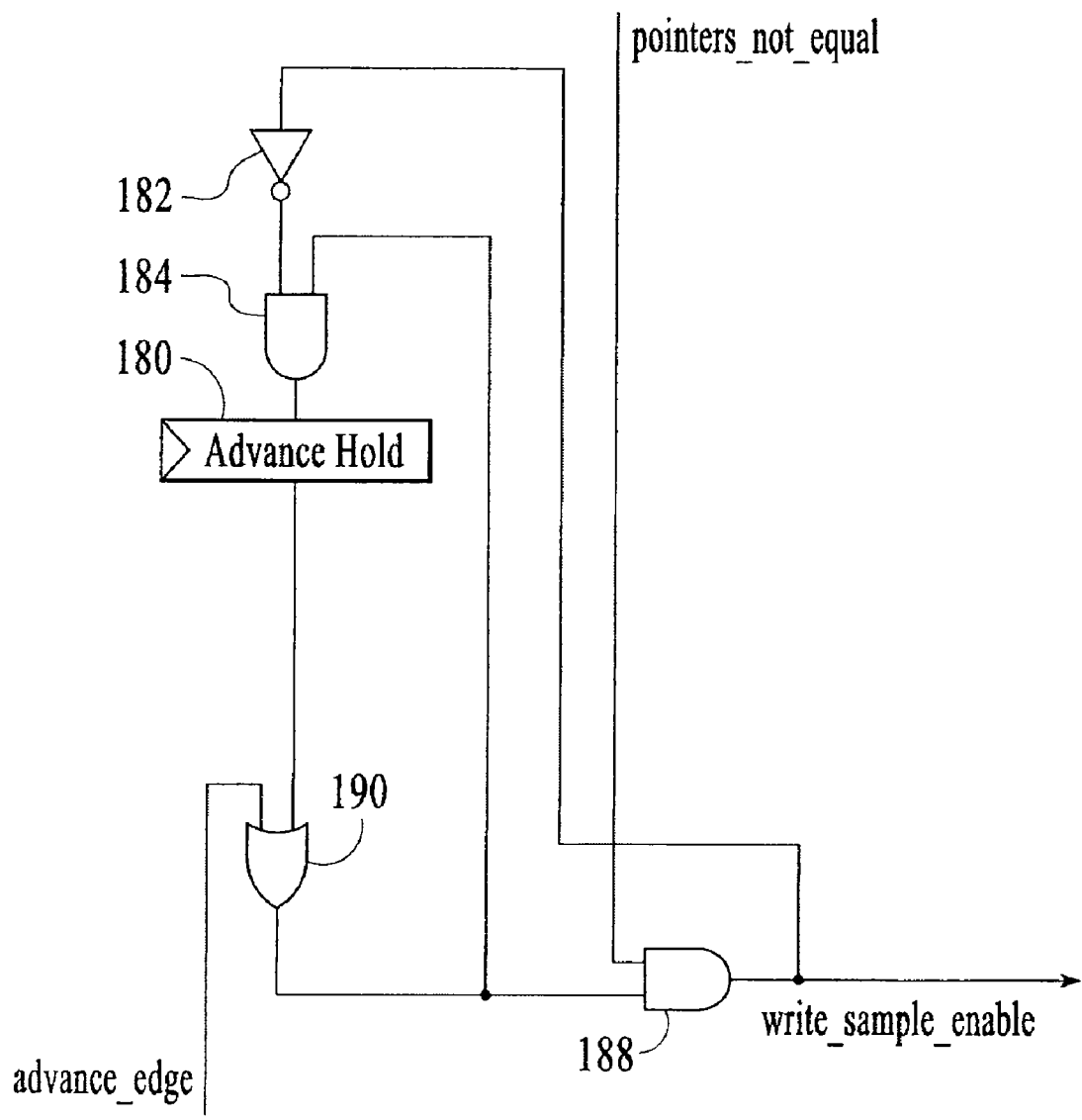
FIG. 4 is a block diagram of the advance hold logic unit of FIG. 3 in accordance with one embodiment.

FIG. 4 is a block diagram of the advance hold logic unit 144 of FIG. 3 in accordance with one embodiment. The advance hold logic unit 144 includes an advance hold unit 180, an inverter 182, AND gates 184 and 188, and an OR gate 190. In one embodiment, the source may receive an acknowledgement, also referred to as an advance signal, from the destination. The advance signal acknowledges that the sampled write pointer was copied to the write copy unit 126. If the advance signal is received before the write pointer changes again, the source holds the advance signal until the pointer changes. The destination will know when the write pointer changes again; because once the write pointer changes, it is sampled and the destination is signaled that the source's sampled write pointer has been updated. In some cases it is desirable to delay this signal (that the write pointer has been changed again) for some number of cycles after the write pointer changes. This avoids signaling to the destination after only a single entry has been written by the source to the buffer 102. Accordingly, this delays the destination sending the advance signal to the source. By holding/delaying the advance signal, the source may write several entries in the buffer 102 before signaling the destination that the write pointer has been changed again. This helps reduce the effects of a "startup delay" of an empty buffer. In one embodiment, the number of cycles the advance signal is held in this situation is determined by a programmable register such as the delay init unit 202 described below in connection with FIG. 5.

Figure 5:
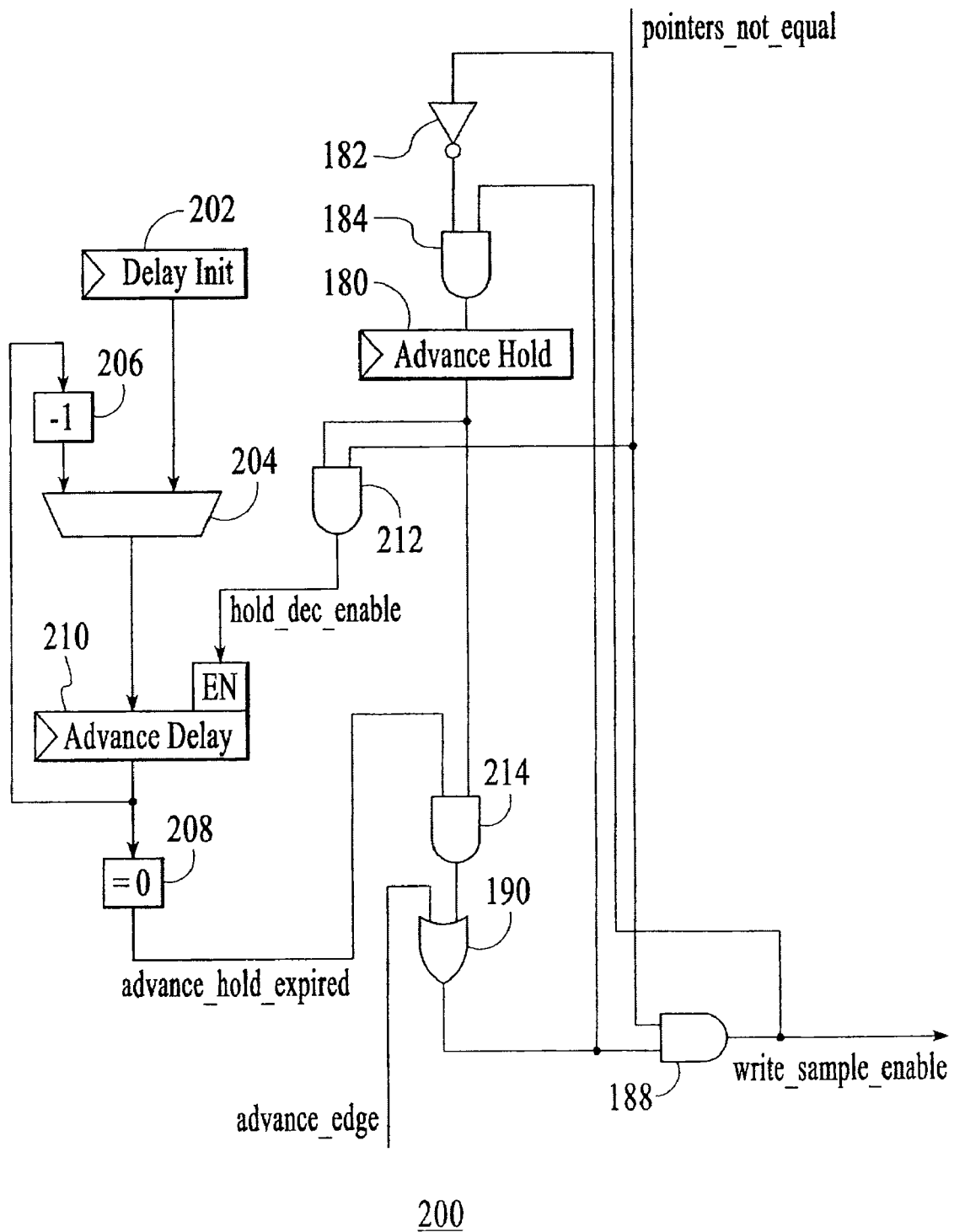
FIG. 5 is a block diagram of an advance hold logic unit, which may be used to implement the advance hold logic unit of FIG. 3, in accordance with another embodiment.

FIG. 5 is a block diagram of an advance hold logic unit 200, which may be used to implement the advance hold logic unit 144 of FIG. 3, in accordance with another embodiment. The advance hold logic unit 200 of FIG. 5 is similar to that of FIG. 4, except that the advance hold logic unit 200 of FIG. 5 also includes a delay initialization unit 202, a multiplexer 204, a decrementer 206, a comparator 208, an advance delay unit 210, and AND gates 212 and 214. The advance hold logic unit 200 also includes an advance hold unit 180, an inverter 182, AND gates 184 and 188, and an OR gate 190.

In one embodiment, the size and depth of the buffer 102 (FIG. 1) may be optimized for particular ranges of frequencies such that the interface does not limit data movement during steady state reads and writes. Embodiments function properly, if not optimally, regardless of frequency/phase relationships between the clocks. In one embodiment, the buffer 102 may be optimized for a "nominal" (typical) operating point (i.e., some frequency relationship between the domains) such that the slower side (source/destination) limits data movement. As a result, the buffer 102 would not be the limiter.

In one embodiment, the read pointer on the destination side can implement a hold delay on its advance signal coming from the source, in a similar fashion described above for the write pointer. This helps to reduce the effects of a "startup delay" when an inactive destination suddenly wakes up and starts reading a full buffer.

As indicated above, a single-bit handshake is used for synchronization. In one embodiment, a single valid bit triggers a sampling of the full pointer when it is known to be stable. This allows any number reads/writes to occur on the faster side before being sampled by the slower side. As a result, bursty read-write behavior at high clock ratios (greater than 2:1) is not throttled by deficiencies in the interface. This also ensures that the read and write pointers do not change while they are sampled. The write side of the interface may fill the buffer as long as a full condition is not met and the read side may read data until an empty condition occurs. This allows the source to continue filling the buffer while waiting for an acknowledgement that the data was received by the destination. The destination is able to read multiple entries from the buffer while updating the source on the status of the accepted data. This leads to a high bandwidth interface.

Figure 6:
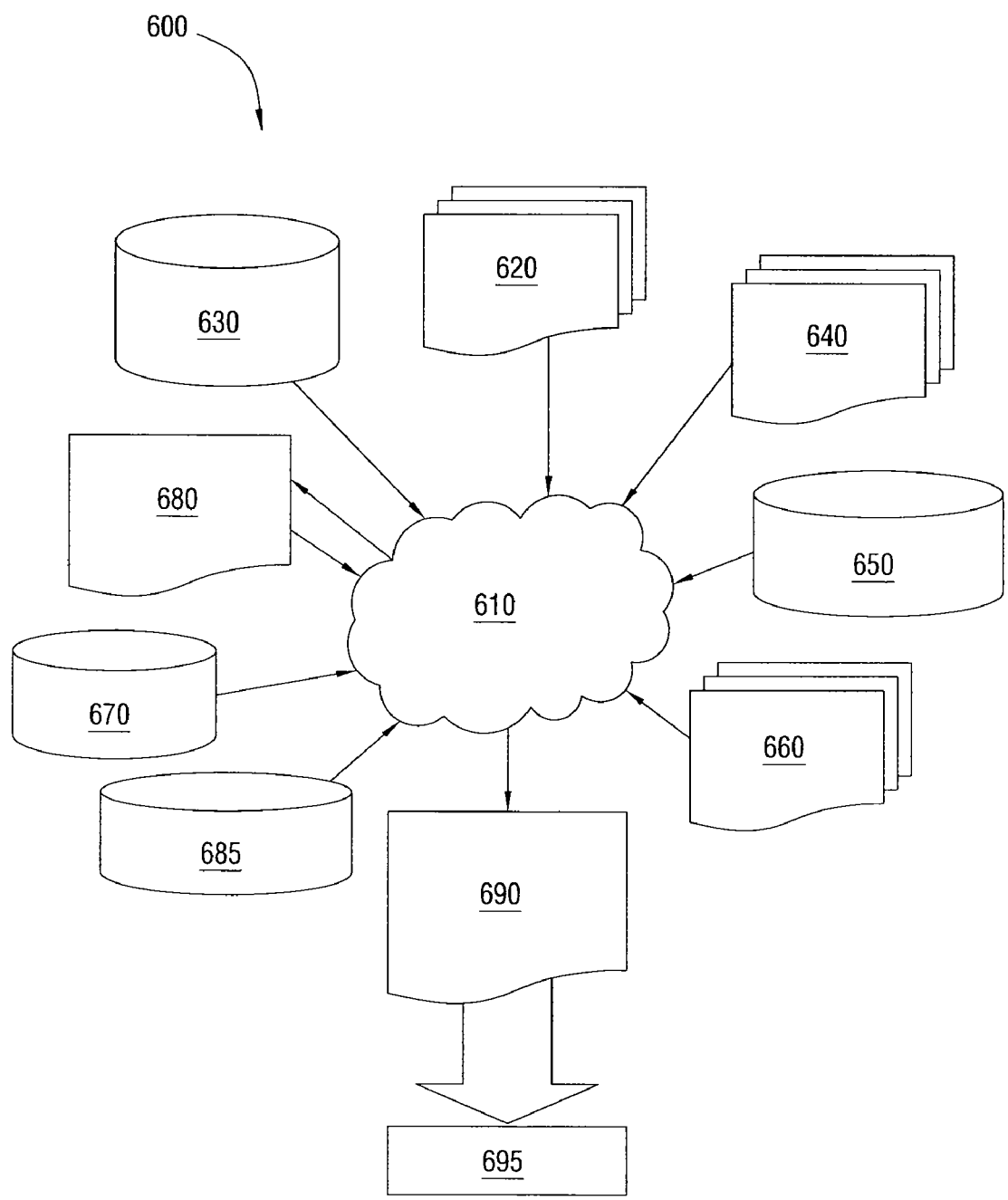
FIG. 6 is a flow diagram of a design process used in semiconductor design, manufacture, and/or test.

FIG. 6 shows a block diagram of an exemplary design flow 600 used for example, in semiconductor design, manufacturing, and/or test. Design flow 600 may vary depending on the type of IC being designed. For example, a design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620 comprises the circuits described above and shown in FIGS. 1 and 3-5 in the form of schematics or HDL, a hardware-description language (e.g., Verilog, VHDL, C, etc.). Design structure 620 may be contained on one or more machine readable medium. For example, design structure 620 may be a text file or a graphical representation of a circuit as described above and shown in FIGS. 1 and 3-5. Design process 610 preferably synthesizes (or translates) the circuit described above and shown in FIGS. 1 and 3-5 into a netlist 680, where netlist 680 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 680 is resynthesized one or more times depending on design specifications and parameters for the circuit.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates a circuit as described above and shown in FIGS. 1 and 3-5, along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1 and 3-5. Design structure (1290) may then proceed to a stage 695 where, for example, design structure 690: proceeds to tape-out, is released to manufacturing, is released to a mask house, is sent to another design house, is sent back to the customer, etc.

According to the system and method disclosed herein, the present invention provides numerous benefits. For example, embodiments of the present invention enable data movement across asynchronous clock domains without relying on fixed frequency or phase relationships between the domains. The interface works properly under any frequency and phase differences, and under dynamically changing frequency and phase differences. Embodiments of the present invention also sustain maximum throughput during steady-state data movement.

A data interface system has been disclosed. In one embodiment, the system includes a buffer that receives data from a source in a source clock domain and stores the data to be read by a destination in a destination clock domain. The buffer functions in both the source clock domain and the destination clock domain. The system also includes a write pointer that points to data written by the source and includes a read pointer that points to data read by the destination, where the write pointer and the read pointer enable the data to be transmitted from the first clock domain to the second clock domain asynchronously.

The present invention has been described in accordance with the embodiments shown. One of ordinary skill in the art will readily recognize that there could be variations to the embodiments, and that any variations would be within the spirit and scope of the present invention. Accordingly, many modifications may be made by one of ordinary skill in the art without departing from the spirit and scope of the appended claims.

What is claimed is:

1. A design structure embodied in a machine readable storage medium for at least one of designing, manufacturing, and testing a design, the design structure comprising:
an interface system comprising:
a buffer that receives data from a source in a first clock domain and stores the data to be read by a destination in a second clock domain, and wherein the buffer functions in both the first clock domain and the second clock domain;
a write pointer that points to data written by the source;
a read pointer that points to data read by the destination, wherein the write pointer and the read pointer are utilized to enable the data to be transmitted from the first clock domain to the second clock domain asynchronously, wherein a sampled copy of the write pointer is sent to the second clock domain to notify the second clock domain that data in the buffer is available for reading; and
a hold unit to cause a delay in sending the sampled copy of the write pointer to the second clock domain by causing a delay in creating the sampled copy of the write pointer for a selected number of clock cycles.

2. The design structure of claim 1 wherein the data can be continuously transmitted from the source to the destination as long as the buffer is neither full nor empty.

3. The design structure of claim 2 further comprising:
a first determination unit that determines whether the buffer is full; and
a second determination unit that determines whether the buffer is empty.

4. The design structure of claim 2 further comprising:
a first determination unit that determines whether the buffer is full by comparing the write pointer to a copy of the read pointer; and
a second determination unit that determines whether the buffer is empty by comparing the read pointer to a copy of the write pointer.

5. The design structure of claim 1 wherein the sampled copy of the write pointer is sent to the second clock domain from the first clock domain.

6. The design structure of claim 1 wherein a sampled copy of the read pointer is transmitted from the second clock domain to the first clock domain.

7. The design structure of claim 1, wherein the design structure comprises a netlist, which describes the interface system.

8. The design structure of claim 1, wherein the design structure resides on the machine readable storage medium as a data format used for the exchange of layout data of integrated circuits.

9. The design structure as recited in claim 1, wherein the interface system further includes determination units to determine whether the buffer is full or empty through a wrap bit that is maintained with each of the write pointer and the read pointer, the respective wrap bit being inverted each time the write pointer or the read pointer wraps to a beginning address of the buffer.

10. The design structure as recited in claim 9, wherein the buffer is determined to be full when the write pointer is equal to the read pointer but the respective wrap bits are different.

11. A design structure embodied in a machine readable storage medium for at least one of designing, manufacturing, and testing a design, the design structure comprising:
a system comprising:
a computer processor;
a buffer coupled to the computer processor, wherein the buffer receives data from a source in a first clock domain and stores the data to be read by a destination in a second clock domain, wherein the buffer functions in both the first clock domain and the second clock domain;
a write pointer that points to data written by the source;
a read pointer that points to data read by the destination, wherein the write pointer and the read pointer are utilized to enable the data to be transmitted from the first clock domain to the second clock domain asynchronously, wherein a sampled copy of the write pointer is sent to the second clock domain to notify the second clock domain that data in the buffer is available for reading; and
a hold unit to cause a delay in sending the sampled copy of the write pointer to the second clock domain by causing a delay in creating the sampled copy of the write pointer for a selected number of clock cycles.

12. The design structure of claim 11 wherein the data can be continuously transmitted from the source to the destination as long as the buffer is neither full nor empty.

13. The design structure of claim 12 further comprising:
a first determination unit that determines whether the buffer is full; and
a second determination unit that determines whether the buffer is empty.

14. The design structure of claim 12 further comprising:
a first determination unit that determines whether the buffer is full by comparing the write pointer to a copy of the read pointer; and
a second determination unit that determines whether the buffer is empty by comparing the read pointer to a copy of the write pointer.

15. The design structure of claim 11 wherein the sampled copy of the write pointer is sent to the second clock domain from the first clock domain.

16. The design structure of claim 11 wherein a sampled copy of the read pointer is transmitted from the second clock domain to the first clock domain.

17. The design structure of claim 11, wherein the design structure comprises a netlist, which describes the system.

18. The design structure of claim 11, wherein the design structure resides on the machine readable storage medium as a data format used for the exchange of layout data of integrated circuits.

19. The design structure as recited in claim 11, wherein the system further includes determination units to determine whether the buffer is full or empty through a wrap bit that is maintained with each of the write pointer and the read pointer, the respective wrap bit being inverted each time the write pointer or the read pointer wraps to a beginning address of the buffer.

20. The design structure as recited in claim 19, wherein the buffer is determined to be full when the write pointer is equal to the read pointer but the respective wrap bits are different.

* * * * *